US010091228B2

(12) United States Patent
Li et al.

(10) Patent No.: US 10,091,228 B2
(45) Date of Patent: *Oct. 2, 2018

(54) SECURED EVENT MONITORING LEVERAGING BLOCKCHAIN

(71) Applicant: INTERNATIONAL BUSINESS MACHINES CORPORATION, Armonk, NY (US)

(72) Inventors: Guo Qiang Li, Beijing (CN); June-Ray Lin, Taipei (TW); Ronald Williams, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/700,228

(22) Filed: Sep. 11, 2017

(65) Prior Publication Data
US 2018/0219893 A1 Aug. 2, 2018

Related U.S. Application Data

(63) Continuation of application No. 15/418,050, filed on Jan. 27, 2017.

(51) Int. Cl.
*G06F 11/00* (2006.01)
*H04L 29/06* (2006.01)

(52) U.S. Cl.
CPC ...... *H04L 63/1425* (2013.01); *H04L 63/1441* (2013.01)

(58) Field of Classification Search
CPC .................................................. H04L 63/1425
(Continued)

(56) References Cited

U.S. PATENT DOCUMENTS

| 7,555,516 B2* | 6/2009 | Lamport | G06F 11/1494 |
|---|---|---|---|
| | | | 709/201 |
| 9,380,430 B2 | 6/2016 | Vos et al. | |

(Continued)

FOREIGN PATENT DOCUMENTS

DE 102016101665 A1 8/2016

OTHER PUBLICATIONS

Long et al., "Detection of Intrusion Across Multiple Sensors," The MAITA Project, Apr. 23, 2003, 9 Pages, MIT Clinical Decision Making Group.

(Continued)

*Primary Examiner* — Peter C Shaw
(74) *Attorney, Agent, or Firm* — Erik K. Johnson

(57) ABSTRACT

A method, computer system, and a computer program product for a monitor security process is provided. The present invention may include configuring monitors in a chain configuration by configuring a network address of a primary monitor to a backup monitor. The present invention may include configuring a sensor to communicate with the monitors. The present invention may include receiving a first set of information from the sensor to a primary and backup monitor and broadcasting the information to a plurality of monitors and logging the information. The present invention may include receiving a second set of information from the chain of monitors. The present invention may include determining the information conflicts and marking a temporary log within the plurality of temporary logs as conflicting. The present invention may include determining a conflicting threshold has been exceeded, generating and executing an audit and recovery plan that isolates the affected monitor.

1 Claim, 8 Drawing Sheets

(58) Field of Classification Search
USPC .......................................................... 726/23
See application file for complete search history.

(56) References Cited

U.S. PATENT DOCUMENTS

| 2011/0214009 A1* | 9/2011 | Aggarwal ............ G06Q 10/063 |
| | | 714/4.11 |
| 2016/0212159 A1 | 7/2016 | Gupta et al. |
| 2016/0219063 A1* | 7/2016 | Nadkarni ............ H04L 63/1441 |
| 2016/0259937 A1 | 9/2016 | Ford et al. |
| 2016/0261611 A1* | 9/2016 | Heilig ................. H04L 63/1425 |

OTHER PUBLICATIONS

Mell et al., "The NIST Definition of Cloud Computing," National Institute of Standards and Technology, Sep. 2011, p. 1-3, Special Publication 800-145.

Onieva et al., "Information Security Theory and Practices: Smart Devices, Convergence and Next Generation Networks," Second IFIP WG 11.2 International Workshop (WISTP), May 13-16, 2008, p. 1-149, LNCS 5019, Springer-Verlag Berlin Heidelberg, Seville, Spain.

IBM, "List of IBM Patents or Patent Applications Treated as Related (Appendix P)," Apr. 6, 2018, p. 1-2.

Li et al., "Secured Event Monitoring Leveraging Blockchain," Application and Drawings, Filed Jan. 27, 2017, 48 Pages, U.S. Appl. No. 15/418,050.

* cited by examiner

SECURED EVENT MONITORING LEVERAGING BLOCKCHAIN

BACKGROUND

The present invention relates generally to the field of computing, and more particularly to secured event monitoring.

On a computer system or network, data may be monitored for many different purposes. Data monitoring may identify problems, observe conditions or track metrics by logging the events of a given computer system or network. Securing a data log using monitor security protocols may be accomplished with different levels of security, ranging from low security to high security, and have various combinations of hardware and software configurations. Low security may allow open access to the event logs while high security may significantly restrict access to the event logs. Protecting the monitored system from hackers gaining access to alter the event logs may require a new type of security configuration.

SUMMARY

Embodiments of the present invention disclose a method, computer system, and a computer program product for a monitor security process. The present invention may include configuring a plurality of monitors in a chain configuration, wherein the chain configuration consists of configuring a network address of a primary monitor to a backup monitor being added to the chain network. The present invention may also include configuring a sensor to communicate with the plurality of monitors, wherein the network address of each monitor is configured on the sensor. The present invention may then include receiving, by a primary monitor, a first set of information from the sensor based on an event. The present invention may further include receiving, by a backup monitor, the first set of information from the sensor based on an event. The present invention may also include broadcasting the received first set of information from the primary monitor and the backup monitor to the plurality of monitors. The present invention may then include logging the received first set of information in a plurality of temporary logs associated with the plurality of monitors. The present invention may further include receiving a second set of information from a monitor within the plurality of monitors. The present invention may also include determining that the received first set of information does not match the received second set of information. The present invention may then include marking at least one temporary log within the plurality of temporary logs as a conflicting entry based on determining that the received first set of information does not match the received second set of information. The present invention may further include determining that a number of conflicting entries in the plurality of temporary logs has exceeded a predefined threshold based on marking at least one temporary log within the plurality of temporary logs as a conflicting entry. The present invention may also include generating an audit and recovery plan based on determining that the number of conflicting entries in the plurality of temporary logs has exceeded the predefined threshold. The present invention may then include implementing a quarantine of an affected monitor based on the generated audit and recovery plan, wherein the generated audit and recovery plan isolates the affected monitor, and wherein the affected monitor is reassigned to the next monitor in the chain configuration.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
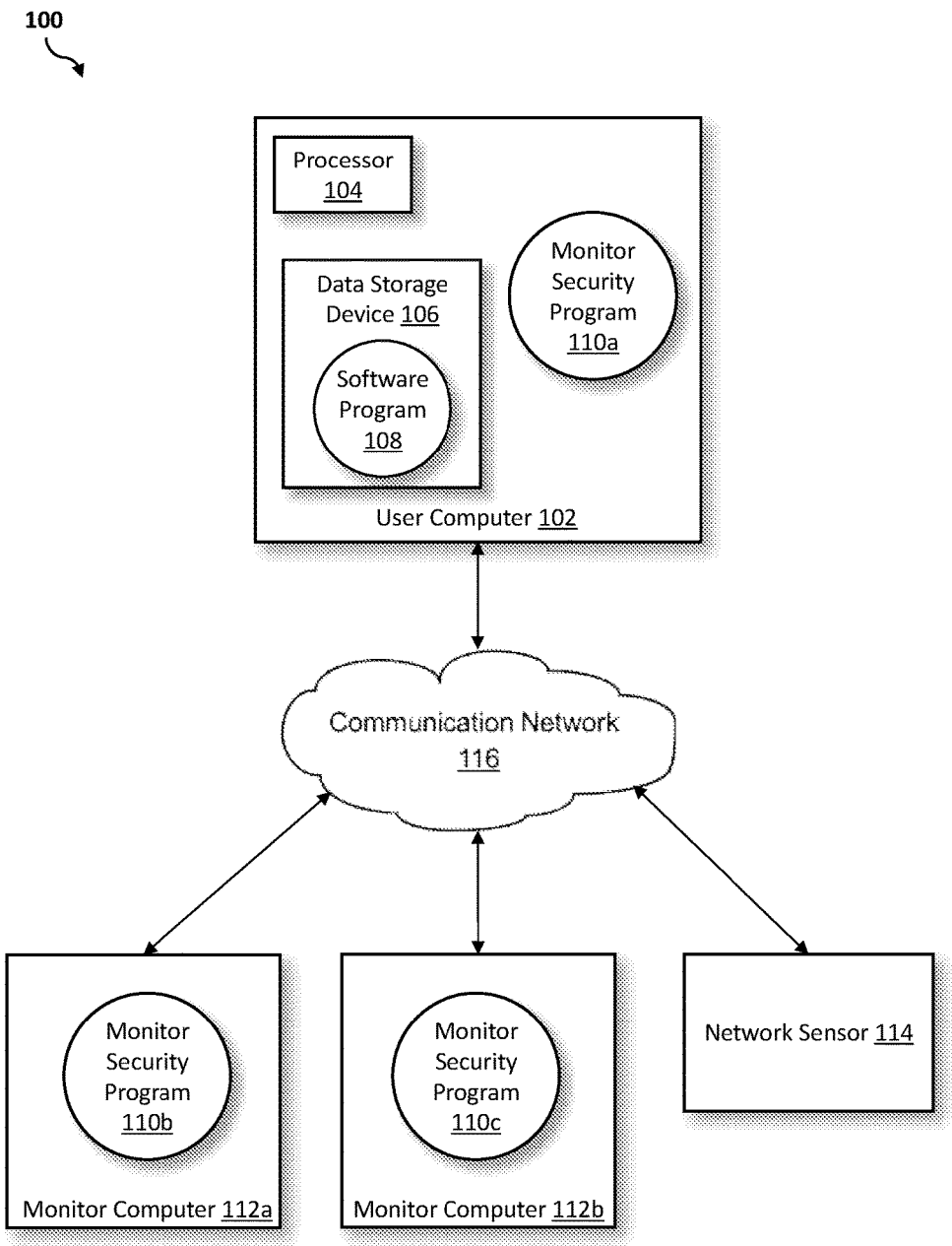
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for monitoring and securing event logs on a monitor. As such, the present embodiment has the capacity to improve the technical field of computer security by implementing new methods to ensure hackers cannot gain access to valuable data on a computer and cannot access, read or write to an event log in a computing network environment. More specifically, more than one monitor may be used in conjunction with dual reporting sensors to detect invasion and secure the event log in a case where someone gained access to the event log on a monitor system. The monitor system may consist of multiple monitors set up in a chain configuration where each monitor may be configured to receive information from a dual reporting sensor. The monitor system may require consensus from all monitors before writing to the event log. Further, the monitor configuration may use known blockchain technology to write to an event log by hashing a batch of events before the events are written to the event log. Blockchain technology consists of a shared ledger of transactions (i.e., shared log of events) that are kept in blocks of data passed to the next transaction in a linear order. Every monitor may contain the same log transactions and hashed values for every ledger in the blockchain. The monitor security program may, upon a detected intrusion, enable an audit and recovery plan for the compromised monitor in the series of monitors. The audit and recovery plan may require consensus from the other monitors before the recovery plan is implemented and the affected monitor rejoins the monitor network.

As described previously, on a computer system or network, data may be monitored for many different purposes. Data monitoring may identify problems, observe conditions or track metrics by logging the events of a given computer system or network. Securing a data log using monitor security protocols may be accomplished with different levels of security, ranging from low security to high security, and have various combinations of hardware and software configurations. Low security may allow open access to the event logs while high security may significantly restrict access to the event logs. Protecting the monitored system from hackers gaining access to alter the event logs may require a new type of security configuration.

Hackers gaining access to a computer network event log may alter past events or set the event log to ignore future threats. Protecting the network from people gaining read and write access to an event log may create a more secure computing environment that may protect the network from outside threats. A threat, for example, may be a hacker who hijacks a company's centralized monitor that is able to handle problems within a whole enterprise network. Once hijacked, the monitor may be blinded from the threats, not recognize threats that are occurring and may not be able to secure the vulnerability in the network.

In addition to gaining access to the event logs, an Application Programming Interface (API) configuration network may give hackers access to data and personal information contained in the records of each networked computer. API integration may be a standard interface for network computers to communicate and interact with a specific set of requirements. API integration may also leave computer networks vulnerable to outside attacks.

API network connections may create a computer network environment that may be hardware-dependent, where the personal data on the computing device may be stored on the same hardware components as the monitor system. The personal computing device may be, for example, the monitored system that keeps bank records, auditor records, or a device that keeps personal data. Keeping the event log on the same hardware components as the computer records may give hackers access to both the event log and the computer records if access is gained. Alternatively, a hardware-independent computer network environment with one monitor as a separate computing device on the monitored system may improve the vulnerability of personal information accessible to hackers, however, with one monitor in a network system, the monitor may be hacked and there may be no way to know of the invasion.

Hardware independence may also separate the sensor and the monitor. Typically, in order to protect a monitor from hackers, having the sensor not be aware of the monitor allows hackers to penetrate the sensor without the ability to reach the monitor system (e.g., monitor computers) or the monitored system (e.g., user computer or an enterprise network). In this configuration, the monitor may know about the sensor, however, the sensor may not be aware of the monitor system or the monitored system. Strict-hard security protocols may be built upon to create a hardware-independent computing environment. Strict-hard security offers limited awareness of a monitor, may have hardware restricted connections and may be independently synchronized from the network system. Hardware independence alone may not solve monitor security issues since a benefit of hardware independence is that none of the devices know about each other, however, that benefit may create a more detrimental situation if a monitor is hacked. If a monitor is hacked in a purely hardware-independent environment, then there may be no way of knowing about the intrusion.

A monitor may be vulnerable to threats in a situation where a company utilizes one monitor device to monitor a whole enterprise network. In an enterprise network, if an issue arises in a certain region of the network, then the monitor can report the issue and the company can handle the problem. However, if the one monitor is hacked then the company may be blinded and not be alerted of any issues in the enterprise network, and further, not be aware that an issue in the network needs to be addressed. A hacker seizing control of a monitor may clean up past events or set up the monitor system to ignore future threats. Therefore, it may be advantageous to, among other things, provide a way to secure the monitor and the monitored system in a computer network environment from hackers attempting to hijack the monitor to alter event logs and gain access to valuable information by creating a monitor network with monitors and configuring sensors to report duplicate data to more than one monitor in the monitor network simultaneously, thereby detecting possible hacks due to mismatched data.

According to at least one embodiment, the addition of one or more monitors in communication with dual reporting sensors in a computer network environment may provide a higher level of security to a network system. Each monitor may not have equal rights to make decisions, however, each monitor may have collaborative rights on an event log to require consensus among the monitors before data may be written into an event log. The consensus requirement may show data discrepancies if one monitor is hacked since the hacked monitor may send inconsistent data to all other monitors in the network system based on the information provided by the sensor. The dual reporting sensor may report information to at least two monitors connected in parallel. Parallel configuration of the monitors may allow the monitors to communicate to each other. If two monitors are reporting different information after receiving the same information from the sensor, then the monitor may have been compromised. The sensor may report to a randomized pair of monitors in the monitor network which may allow a shadowing effect for the monitors.

The more monitors in a system network, the more difficult hijacking and altering an event log becomes. Having synchronized monitors set-up in a blockchain configuration ensures consensus among the monitors. Since one monitor alone cannot alter the event log in the past or cannot fake the event log in the future, if one monitor is hacked, then there may be no consensus among the synchronized monitors and the event may not get written into the log. The dual reporting sensors may be used to enable consensus among the monitors for the received events before the received events get written into the log. The sensors allow consensus by communicating the same information to more than one monitor so when the monitors are validating information, if the information received for a specific event or transaction differs, then one monitor may have been compromised.

If the monitor security program determines that a monitor in the network system has been compromised, then the monitor security program may initiate an audit and recovery process. The audit and recovery process may be requested from the monitor security program if any monitor fails to validate data for the log or if a threshold has been reached. A conflict threshold may be reached if a predetermined number of conflicts are reported where data may conflict with the other monitors synchronized in the network. A loss threshold may be reached if a predetermined number of losses are reported where data may be missing compared to other monitors synchronized in the network. The audit and recovery process may then develop a recovery plan by analyzing which monitor may have the most conflict or loss occurrences. The compromised monitor may then be quarantined from the synchronized monitor network system. The recovery plan may then be broadcasted to each monitor in the network and if a predetermined number of monitors agree with the recovery plan, the monitor security program may implement the recovery plan. If the predetermined number of monitors do not agree with the recovery plan, then human intervention may be necessary.

The computer system network structure may be a set of blockchained monitors that communicate with dual-reporting sensors where the blockchained monitors are synchronized so one monitor alone cannot alter the event log from a past event or falsify an event log in the future. Blockchain technology is a known technology and may be used for the network system to have consensus, authenticity, immutability and finality of the logged events. As previously stated, blockchain technology consists of a shared log of events that are kept in blocks of data passed to the next transaction in a linear order. An example of blockchain may be three parties, Party A, Party B and Party C, conducting a transaction. Thereafter, the transaction will be noted in the ledger. If the ledger had an inconsistency or the record was destroyed, then recovery of the transaction details may be very difficult. With blockchain technology, when a transaction is written into a ledger, there may be a mechanism to make sure all the records are synchronized and if the network system detects an error, the error may be immediately corrected. Blockchain systems are immutable since the system creates a hash value on each block and any change in data will show a different hash value.

The dual reporting sensors enable consensus among the monitors before the received events are written into the log. Consensus may occur when the dual reporting sensor transmits the same information to more than one monitor at the same time. A sensor may transmit data to more than two monitors in a network system. Once the monitors in the chain all receive the same information, each monitor may validate the information before data may be written into the shared log. The blockchained monitors may be hardware-independent from the monitored system (e.g., user computer) which may give the monitored system limited information. The limited information available to the monitored system may be an alert from the monitor security program that the monitors have been compromised, however, the independent nature of the hardware may keep the monitored system's personal records stored in a separate location from the event log.

Limiting the information that may crossover between the monitor system and the user computer personal records may create a more secured environment for the computer network system. Another form of protection for the computer network, in addition to restricting read and write access to logs, may be to alter the hardware setup where the network communicates in a blockchain format, giving the monitors limited access to information.

The type of monitor security used may include strict-hard security. Characteristics of strict-hard security are limited awareness of the monitor, hardware connection restrictions and independent monitor synchronization. Monitors in a strict-hard security system may be able to independently gather state information in order to remove the monitor dependence in the network system.

In addition to strict-hard security, there may be more than one interlocking monitor working in parallel with dependency amongst the monitors. All monitors in the interlocking system may collaboratively write on the same event log, using the concept of a hyper-ledger, and using hashed blocks of data to protect the log. Blockchain technology is a known technology and may be used for the network system to have consensus, authenticity, immutability and finality of the logged events. The monitors may not write into the log without consensus that each monitor agrees with the data to be written into the log. Once a certain number of events have been written into a temporary log (e.g., 100 events), and each monitor provides consensus and authenticity, then the transaction of events may be written into the event log (e.g., the ledger). Next, the ledger may send a group of transactions to the next ledger in a hash, an algorithm that turns a large amount of data into a fixed length hash. The data may be unchanged and immutable. If the data is modified, the hash value may be different. Each block may contain the hash of the previous block and the current transactions before the next hash may be created. For example, after 100 transactions and all other monitors have consensus that the data is verified. Each blockchain may have a hash value of the previous block in the chain and there may be no way to modify the data in the previous block. If the data is modified, the modified data may be detected by a re-calculated hash value. A different hash value may show that the network system has been compromised.

Sensors may be introduced to the monitor system where each sensor may be a dual reporting sensor. Each dual reporting sensor may report information and events to at least two monitors in parallel, allowing the monitors to shadow each other. Once the sensors are configured to communicate with the monitors, the sensors may report to a randomized pair of monitors. The monitor collects information (e.g., data or events) from the sensor and the sensor may be used to sense a threat. An example of a threat may be that a network environment was hacked or the sensor may be a fire sensor that detects smoke or heat, which may then notify the user through the monitor.

The monitor security program may allow implementation of more monitors in a system. The network system may use more monitors to increase the difficulty of a person hacking into the network. More monitors combined with blockchain immutability may create a less vulnerable network. Monitor consensus in a blockchained network environment may provide more security since the monitors must validate the events with all other monitors before the event may be written into the event log. When a monitor receives an event, the monitor may broadcast the event to all other monitors in the network system. At the first event, a new block may be created and may collect a predetermined number of events (e.g., 100 events) or may reach a certain interval, such as a time interval. For every interval or predetermined number of events, one monitor may be chosen (e.g., coordinator monitor) to create a block and upon creation of a block, the chosen monitor may broadcast the block to all other monitors in the network system for validation. Once the other monitors validate the block, the result may be broadcasted again. Then, if the coordinator monitor receives an acceptable message (e.g., pass or go) from all other monitors in the network system, the chosen monitor appends the block to the chain. After each block, a different monitor may be chosen to become the coordinator monitor.

A monitor may be compromised if a monitor deletes an event, does not broadcast the event to the other monitors, or broadcasts different information than what the sensor provided. Since each sensor may report to two monitors, a primary monitor and a backup monitor, in the event of a hacker deleting an event from one monitor, the other monitor may broadcast the event to all other monitors which may alert the monitor security program of inconsistent data written into the temporary log. The primary and backup monitors may be the monitors to which the dual reporting sensor provides data. The coordinator monitor moves linearly through the chain of monitors. There may be times the primary monitor is the coordinator monitor, the backup monitor is the coordinator monitor and when neither monitor may be the coordinator monitor. The coordinator monitor role may not be dependent on the sensors random choosing of the primary monitor.

Referring to FIG. 1, an exemplary networked computer environment 100 in accordance with one embodiment is depicted. The networked computer environment 100 may include a user computer 102 and monitor computers 112a, 112b with a processor 104 and a data storage device 106 that is enabled to run a software program 108 and a monitor security program 110a-c (i.e., 110a-c). The networked computer environment 100 may also include a network sensor 114 that that may interact with a user computer 102 and monitor computers 112a, 112b through a communication network 116. A communication network 116 may also be called a network. The networked computer environment 100 may include a plurality of user computers 102, monitor computers 112a, 112b, and sensors 114, only one such embodiment is shown. The communication network 116 may include various types of communication networks 116, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The user computer 102 and monitor computers 112a, 112b may communicate with the network sensor 114 via the communications network 116. The communications network 116 may include connections, such as wire, wireless communication links, or fiber optic cables. As will be discussed with reference to FIG. 5, network sensor 114 may include internal components 902a and external components 904a, respectively, and user computer 102 and monitor computers 112a, 112b may include internal components 902b and external components 904b, respectively. The user computer 102, monitor computers 112a, 112b, and the network sensor 114 may also operate in a cloud computing service model, such as Software as a Service (SaaS), Platform as a Service (PaaS), or Infrastructure as a Service (IaaS). The user computer 102, monitor computers 112a, 112b, and the network sensor 114 may also be located in a cloud computing deployment model, such as a private cloud, community cloud, public cloud, or hybrid cloud. User computer 102, monitor computers 112a, 112b, and network sensor 114 may be, for example, a mobile device, a telephone, a personal digital assistant, a netbook, a laptop computer, a tablet computer, a desktop computer, or any type of computing devices capable of running a program, accessing a network, and accessing a database. According to various implementations of the present embodiment, the monitor security program 110a-c may interact with a database that may be embedded in various storage devices, such as, but not limited to a computer/mobile device 102, 112a, 112b, a network sensor 114, or a cloud storage service.

According to the present embodiment, a user utilizing a user computer 102 or monitor computers 112a, 112b may use the monitor security program 110a-c (respectively) to secure event logs on a monitor system from hackers. The monitor may be a monitor computer 112a, 112b that communicates with a dual reporting network sensor 114 where the dual reporting network sensor 114 reports events to more than one monitor 112a, 112b set up in a chain configuration to provide consensus of an event before the event gets written into the log. Inconsistent data written into a temporary log on a monitor 112a, 112b may show that the system has been compromised and an audit and recovery process may be implemented. The monitor security method is explained in more detail below with respect to FIGS. 2, 3, 4A and 4B.

Figure 2:
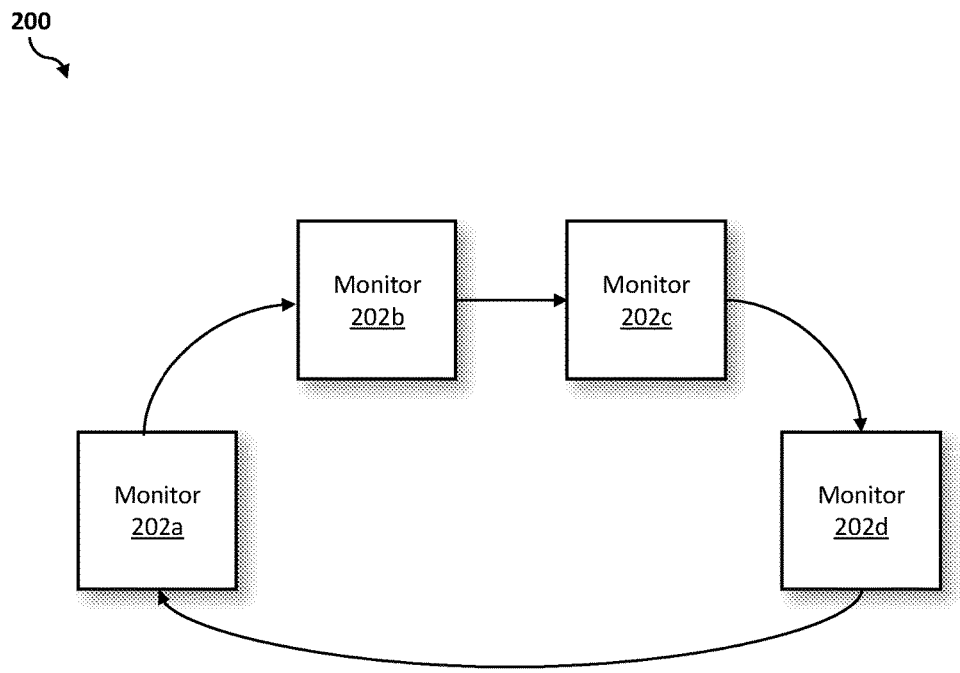
FIG. 2 is a system block diagram illustrating system network connections between blockchained monitors, according to at least one embodiment.

Referring now to FIG. 2, a system block diagram of a monitor network 200 of blockchained connected monitors according to at least one embodiment is depicted. The monitor network 200 may include multiple monitors 202a-d in connection with each other in a chain configuration. Each monitor 202a-d may be a monitor computer 112a, 112b with a monitor security program 110b, 110c, respectively, and a screen (e.g., external component 924) for display. Each monitor 202a-d may also be synchronized to all other monitors 202a-d in the monitor network 200. Each monitor 202a-d in the monitor network 200 may also communicate via a network 116.

Figure 3:
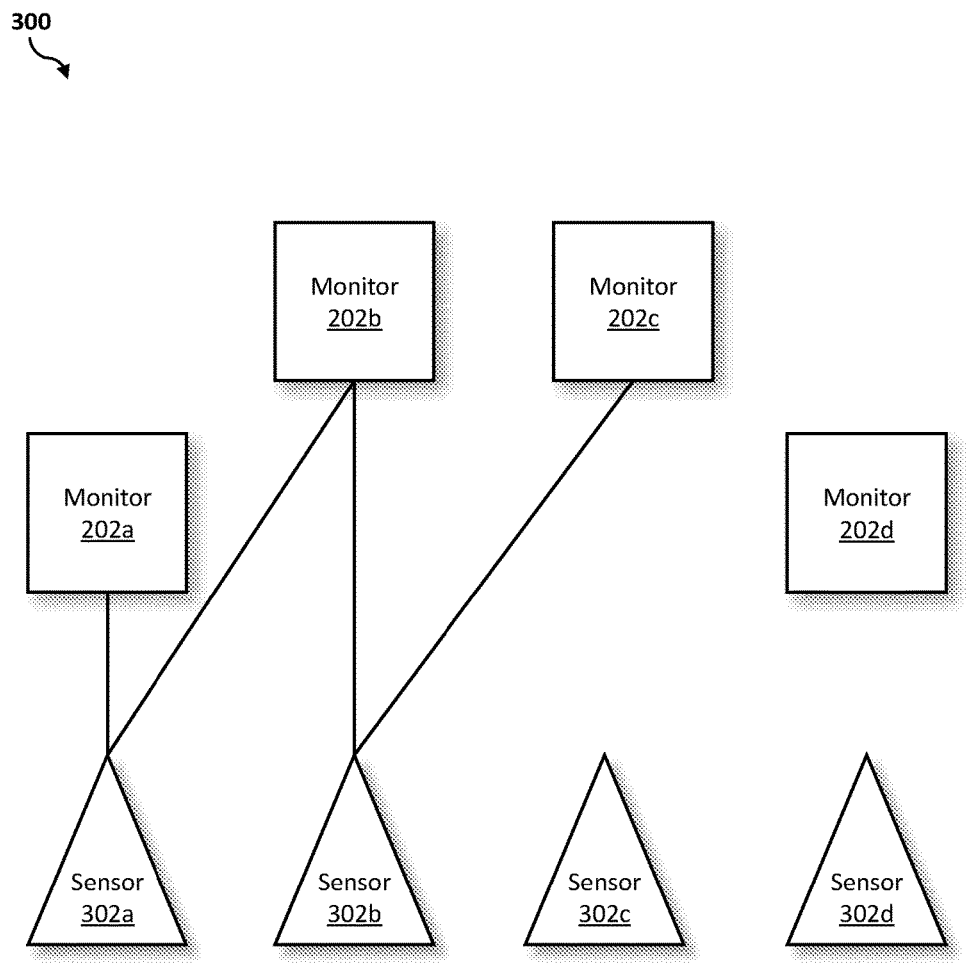
FIG. 3 is a system block diagram illustrating system network connections between monitors and dual reporting sensors, according to at least one embodiment.

Referring now to FIG. 3, a system block diagram of a sensor-monitor network 300 of dual reporting sensors 302a-d communicating with monitors 202a-d according to at least one embodiment is depicted. The monitors 202a-d in the sensor-monitor network 300 may be the same monitors 202a-d as depicted in the monitor network 200. The sensor-monitor network 300 may include dual reporting sensors 302a-d (i.e., sensors 114) in communication with more than one monitor 202a-d at the same time. For example, information is sent from sensor 302a (e.g., smoke is present or data from a company network) to monitor 202a and monitor 202b at the same time, containing the same information.

Figure 4A:
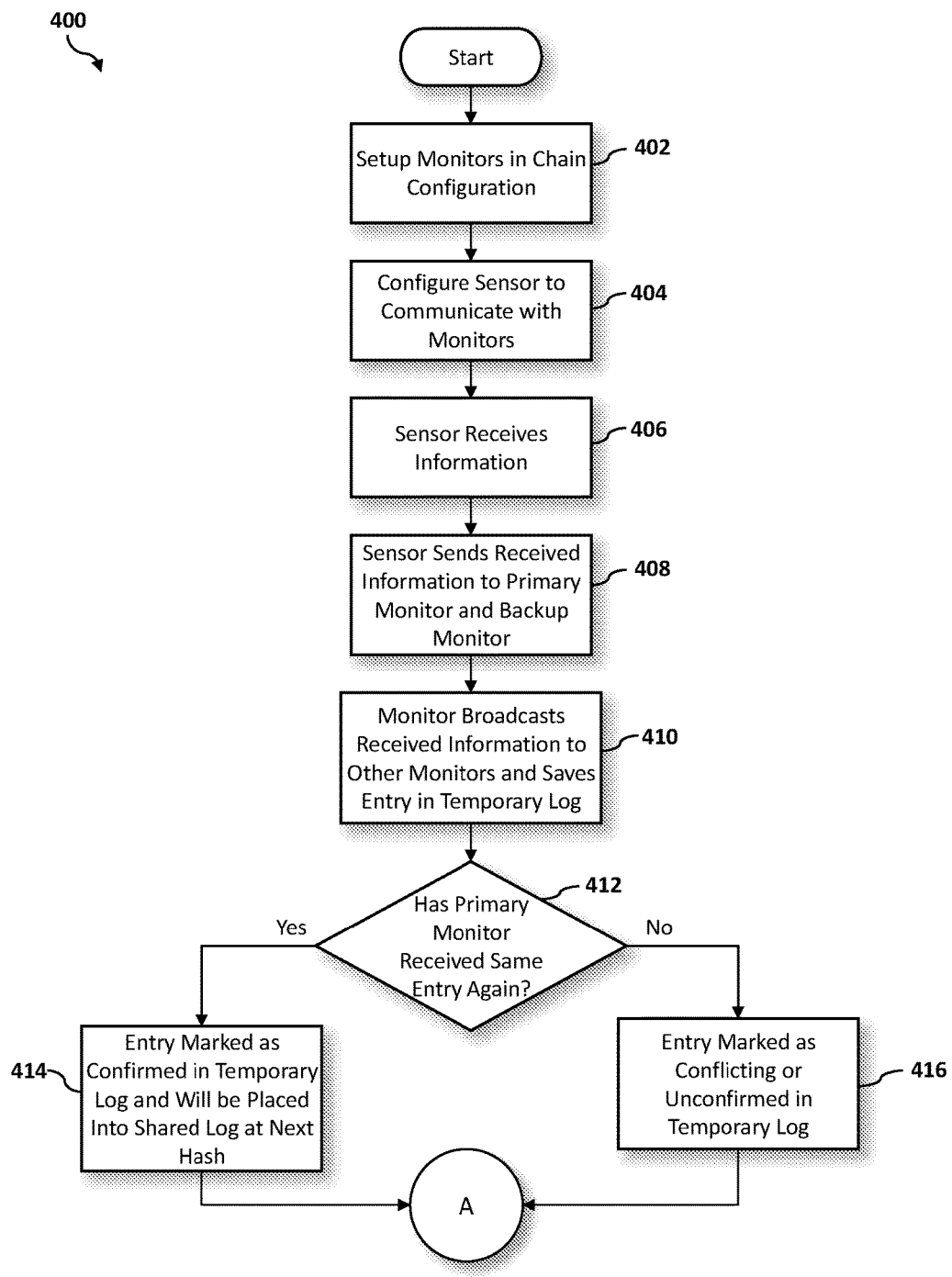
FIGS. 4A and 4B are operational flowcharts illustrating a monitor security process for compromised data in a monitored system according to at least one embodiment.
Figure 4B:
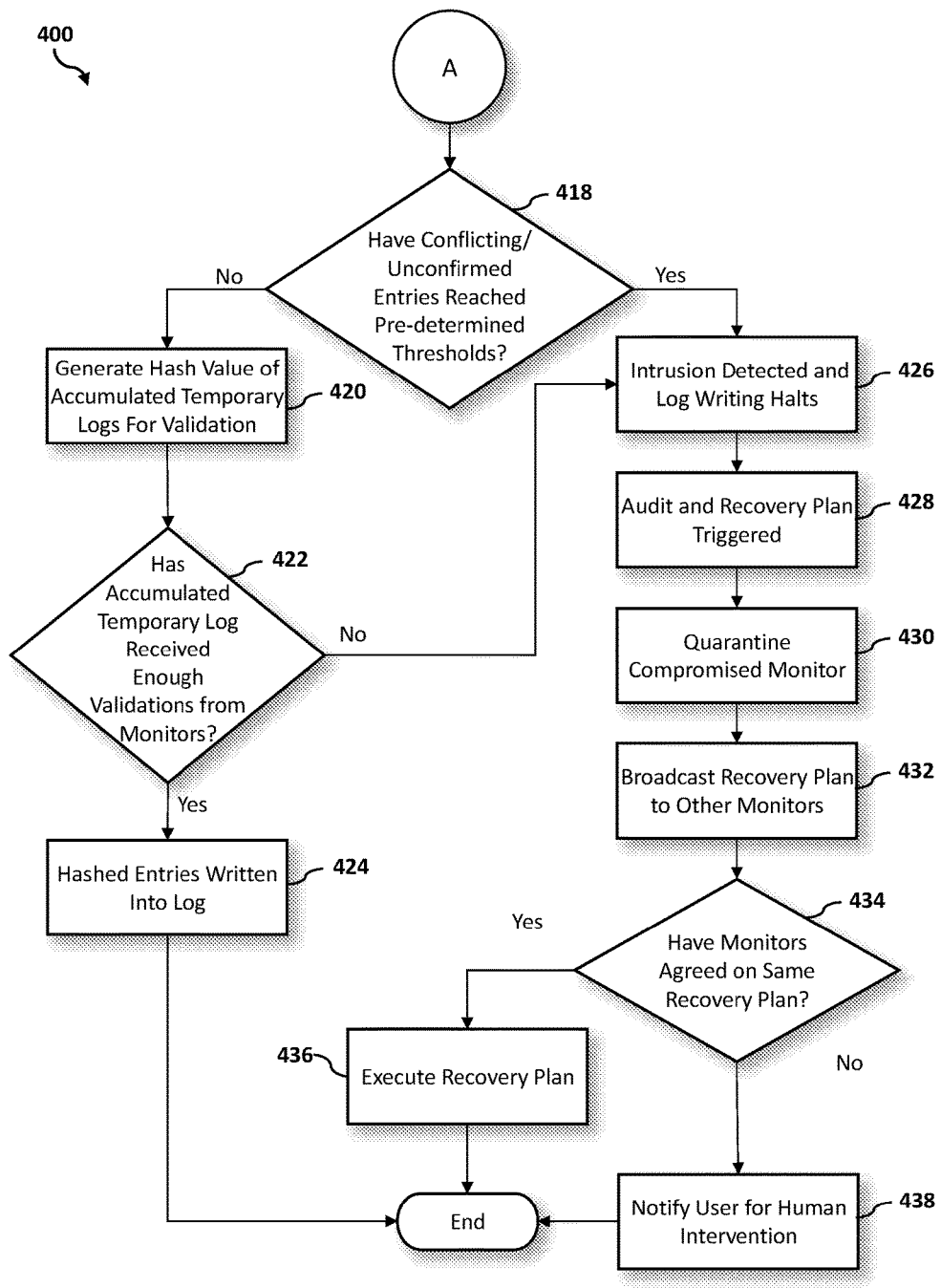

Referring now to FIGS. 4A and 4B, an operational flowchart illustrating the exemplary monitor security process 400 used by the monitor security program 110a-c according to at least one embodiment is depicted.

At 402, the monitors 202a-d are setup in a chain configuration. Configuring a monitor 202a-d in a chain may be accomplished by manually configuring the network address of a preceding monitor (e.g., 202a) on the monitor (e.g., 202b) being added to the chain. The monitors 202a-d may be sequential in the chain configuration so when the monitors 202a-d are chained together, every monitor 202a-d in the chain must coordinate to write to the shared log and one monitor (e.g., 202a) alone cannot write to the shared log. Once a new monitor (e.g., 202b) is setup in the chain network, the monitor security program 110a-c may communicate with the other monitors (e.g., 202a) in the network to get the network addresses of all the monitors 202a-d in the chain network. All the monitors 202a-d in the chain may know how many other monitors 202a-d are in the chain and know the sequence of the monitors 202a-d. The monitor security program (e.g., 110c) on the new monitor (e.g., 202b) in the chain may notify all other monitors (e.g., 202a-d) of the new monitor's (e.g., 202b) logging abilities. Finally, the log may be replicated from all the other monitors 202a-d in the chain. All of the monitors 202a-d in the chain may share the same log after the new monitor (e.g., 202b) has been configured to the chain of monitors 202a-d.

The monitor 202a-d may be a hardware device with a screen for displaying data and may receive information from a sensor 302a-d along a communication network 116. The monitor security program 110a-c on the monitors 202a-d may have an auto-configuration feature, an intrusion detection feature, a shared logging feature and an audit and recovery feature. The auto-configuration feature may configure the monitors 202a-d to the sensors 302a-d and may configure the monitors 202a-d to the other monitors 202a-d in the monitor chain. The intrusion detection feature may be detected when the monitors 202a-d in the monitor chain show conflicting information after the sensor data is broadcasted to all other monitors 202a-d. The intrusion detection feature may also be detected when a monitor 202a-d may not broadcast information even if the sensor 302a-d had sent data to the primary monitor (e.g., 202a) and secondary monitor (e.g., 202b). Another intrusion detection feature may include determining if the monitors 202a-d in the monitor network 200 do not validate broadcasted information to be written into the permanent log. Shared logging on each monitor 202a-d has a temporary logging component and a permanent logging component. The temporary log is kept separately on each monitor 202a-d while the shared log is the permanent log that is written to once consensus is reached within the monitors 202a-d in the monitor chain.

When the monitors 202a-d are chained together, they may create a shared log for logging information from the sensor 302a-d. Once the number of events in a block are received by the coordinator monitor (e.g., 202c), validation of the block of information may be sought with each other monitor 202a-d in the chain to detect an inconsistency among the monitors 202a-d. If an inconsistency is detected, the monitor security program 110a-c may isolate the compromised data before the monitor security program 110a-c may restore the chained monitor.

Next at 404, the monitor security program 110a-c configures the sensor 302a-d to communicate with the monitors 202a-d in the chain network. The sensor 302a-d may be a device that senses information (e.g., smoke detection in a house fire) or collect information (e.g., network data or transactions). The monitor security program 110a-c communicating with the sensor 302a-d may have an auto-configuration feature and a dual reporting feature. The auto-configuration feature on the sensor 302a-d configures the sensor 302a-d to communicate with the monitor security program 110a-c on any monitor 202a-d in the monitor chain. Once configured to the monitor, the sensor 302a-d may send the collected information to the monitor 202a-d via the network. The dual reporting feature on the sensor 302a-d allows the sensor 302a-d to send the collected information to more than one monitor 202a-d at the same time. Sending the collected information to more than one monitor 202a-d at a time may allow the primary monitor (e.g., 202a) and backup monitor (e.g., 202b) in the chain network to broadcast the received sensor data to provide a consensus of the information and validate the information before the shared log is written to.

Configuring a sensor 302a-d to communicate with monitors may be accomplished by manually configuring the network address of a monitor 202a-d on the sensor 302a-d. The monitor security program 110a-c may configure the sensor 302a-d to communicate with the monitor 202a-d by registering a first reporting line (i.e., major reporting line). Once the first reporting line is registered with the primary monitor (e.g., 202a), the primary monitor (e.g., 202a) may then randomly choose a backup monitor (e.g., 202b) and reply to the sensor 302a-d with the backup monitor's (e.g., 202b) network address. The sensor 302a-d may now communicate with the second (e.g., backup 202b) monitor to register a second reporting line. The sensor 302a-d may become a dual reporting sensor 302a-d once both reporting lines are established through the network. New sensors 302a-d that may be added to the network may follow the same protocol. There may be many sensors 302a-d in a network where each sensor 302a-d reports to a random pair of monitors (e.g., 202a and 202b) in the monitor chain. Once the dual reporting sensor 302a-d is configured to communicate with the monitors 202a-d in the chain, the sensor 302a-d may begin collecting the data and communicating with the monitors 202a-d.

Then at 406, the sensor 302a-d receives information. Data that may be collected by the sensor 302a-d may be used for various types of information such as detecting smoke, highway traffic or computer network traffic. For example, if a house has a sensor 302a to detect smoke and a fire erupts, then the sensor 302a will detect the smoke caused by the fire and have received information that smoke is present in the home.

At 408, the sensor 302a-d sends received information to the primary monitor 202a and the backup monitor 202b. After the sensor 302a-d receives information as previously described at 406, then the sensor 302a-d may send the same received data to the primary monitor 202a and a backup monitor 202b at the same time. Each time the sensor 302a-d sends received information to a primary monitor 202a and a backup monitor 202b may be considered one entry for the log. The time each entry is sent to a primary monitor 202a and backup monitor 202b may have the same time stamp. From the preceding example, the sensor 302a may send the received information of smoke to the primary monitor 202a and the backup monitor 202b at the same time.

Next at 410, the monitor security program 110a-c broadcasts the received information to the other monitors 202a-d in the monitor network 200 and each monitor 202a-d saves the entry in a temporary log. The primary monitor 202a and the backup monitor 202b may then notify all other monitors 202a-d by broadcasting the received information to all the monitors 202a-d in the monitor chain network and then save the entry in each monitors 202a-d temporary log. If a monitor 202a-d receives an entry from other monitors 202a-d, then the monitor 202a-d may not be the primary monitor 202a or the backup monitor 202b since the primary monitor 202a and the backup monitor 202b receive information directly from the sensor 302a-d. There may be two broadcasts since two monitors (i.e., the primary monitor 202a and the backup monitor 202b) received the same information from the sensor 302a-d.

Every time the sensor 302a-d sends information to the primary monitor 202a and the backup monitor 202b, the other monitors 202a-d in the chain network may receive two broadcasts. The first time a monitor 202a-d receives broadcasted information, the data may get written into the temporary log of each monitor. The second time a monitor 202a-d receives broadcasted information, the information may be marked as confirmed in the temporary log if the information received from both broadcasts is the same. A third monitor 202a-d may know if there is a discrepancy with the data since the monitor 202a-d may have received different data. When a monitor 202a-d receives a second entry, although the entry indicates the information is from the same sensor 302a-d at the same time, if the contents are different (e.g., one sensor reporting there is a fire and the other sensor reporting there is no fire), then there is conflicting information and the entry will be marked as conflicted in the temporary log. Another type of temporary log entry may be an unconfirmed entry which may occur when only one of the two broadcasts are received. From the previous example, when the sensor 302a detects smoke, the sensor 302a will then send the randomly chosen primary monitor 202a and backup monitor 202b information that there is smoke in the house. The information of smoke detected by the sensor 302a will be saved on the primary monitor's 202a temporary log and the backup monitor's 202b temporary log, and then information will be broadcasted to the rest of the monitors 202a-d in the monitor chain network.

Then at 412, the monitor security program 110a-c determines if the primary monitor 202a received the same entry again. Each monitor 202a-d in the monitor chain network has a temporary log. Each monitor 202a-d also shares one permanent log. Once the entry from the sensor 302a-d is broadcasted to all other monitors 202a-d from the primary monitor 202a and the backup monitor 202b, the first entry received from a monitor 202a-d is stored on that monitor's temporary log and the second corresponding entry received from a monitor 202a-d may be marked as either confirmed, conflicted or unconfirmed. Every monitor 202a-d in the monitor system may receive two entries and if a monitor 202a-d only receives one entry, the entry may be considered unconfirmed since the one entry may not be confirmed or compared against the content of another entry. An example of an unconfirmed entry may be a hacker compromising a monitor 202a-d to delete, hide or withhold information being broadcasted within the monitor network 200. Confirmed entries to the temporary log may be entries that match in content. Conflicting entries may be entries to the temporary log where the information from the two broadcasts previously stated may have conflicting information. The broadcasted information from the primary monitor 202a and the secondary monitor 202b (i.e., backup monitor 202b) may go around to each monitor 202a-d on the chain and come back to the primary monitor 202a and the secondary monitor 202b for confirmation that the sensor 302a-d event is accurate or that the monitor system has not been hacked.

If the monitor security program 110a-c determined that the primary monitor 202a has received the same entry again at 412, then the monitor security program 110a-c marks the entry as confirmed in the temporary log and the entry will be placed into the shared log at the next hash at 414. When a monitor 202a-d receives the same entry again, containing the same information from the sensor 302a-d such as time or contents, then the monitor 202a-d may mark the entry in the temporary log as confirmed. The primary monitor 202a may receive the second entry that is the same as the broadcasted information, confirming the sensor 302a-d event has happened and the event may be marked as confirmed in the temporary log.

Continuing from the previous example, once the information from the primary monitor 202a and the backup monitor 202b has been broadcasted to the other monitors 202a-d in the monitor chain as one entry, and once all monitors 202a-d in the chain confirm receipt of the entry of smoke, then an event will be marked as confirmed in the temporary log and will be entered into the shared log at the next hash. Hash functions are known in the art and may be used to assure integrity of the data since any modification of a previous hashed value may be easily detected. Hashes generally are meant to be unmodified blocks of information. Once a certain number of temporarily logged events are reported (e.g., 100 events), then those entries may be hashed and sent to the permanent log as a hashed value. Each log may show the temporary logged events which may be events prior to the hash and the same log may contain the hashed value of the previous block.

If the monitor security program 110a-c determined that the primary monitor 202a has not received the same entry again at 412, then the monitor security program 110a-c marks the entry as conflicting or marks the entry as unconfirmed in the temporary log at 416. When a monitor 202a-d receives a conflicting entry where the sensor 302a-d and the time are the same but the contents are different, then the monitor 202a-d may mark the entry in the temporary log as conflicted and store the conflicted contents on the same entry in the temporary log. The primary monitor 202a may receive a second entry that differs from the broadcasted information, which may be marked as a conflicting entry in the temporary log. Alternatively, the primary monitor 202a may not receive a second entry from the broadcasted information, which may be marked as unconfirmed in the temporary log. Each monitor's 202a-d temporary log in the monitor chain may be the same and show the same consistencies and inconsistencies. If each monitor 202a-d provides consistent data, then the monitor chain is operating normally. If a monitor 202a-d provides inconsistent data, then that monitor 202a-d may have been compromised.

Continuing with the previous example, the smoke detected in the previous example is then sent from the primary monitor 202a to all other monitors 202a-d in the monitor chain and from the backup monitor 202b to all other monitors 202a-d in the monitor chain as one entry. Once the entry has been broadcasted to all the monitors 202a-d in the chain and comes back to the primary monitor 202a, if the timestamp is the same but the sensor 302a-d is reporting smoke and the broadcast reports that there is no fire, then a monitor 202a-d may have been hacked and the monitor security program 110a-c may log the event as conflicted in the temporary log. Alternatively, if the primary monitor 202a only receives information that there is smoke from the sensor 302a-d and does not receive a second broadcast then the event is marked as unconfirmed in the temporary log since the monitor 202a-d cannot confirm whether or not there is a fire. Each monitor 202a-d in the monitor chain may have a temporary log that may mark confirmed, unconfirmed and conflicting entries. Each monitor's 202a-d temporary log may not match in entry information if a monitor has been compromised.

At 418, the monitor security program 110a-c determines if the conflicting entries, the unconfirmed entries, or both conflicting and unconfirmed entries, have reached pre-determined thresholds. In a chain of monitors 202a-d, one monitor may be the primary monitor 202a for a sensor 302a-d and a second monitor may be the backup monitor 202b for the same sensor 302a-d. The primary monitor 202a and the backup monitor 202b may be different monitors 202a-d each time an event occurs (i.e., information is transmitted over the network 116 from the network sensor 114). Conflicting and unconfirmed entries may have a set threshold to operate within. If the number of conflicting, unconfirmed, or both conflicting and unconfirmed entries reach a pre-determined threshold, then the audit and recovery process may be triggered since the reached threshold may show that one or more monitors may have been compromised. Alternatively, if the pre-determined thresholds have not been reached, then the monitor security program 110a-c may generate a hash value of accumulated temporary logs for validation.

The loss value (i.e., unconfirmed value) and the conflict value may have a threshold number of entries allowed (e.g., 3 entries for a conflict value and 5 entries for a loss value) or a percentage of entries allowed (e.g., 3% for a conflict value and 5% for a loss value) before the audit and recovery process may be initiated. If the conflict value and the loss value stay under the pre-determined threshold values for a specific number of entries (e.g., 100 entries) then the monitor security program 110a-c may generate a hash value of the accumulated temporary logs for validation among all other monitors 202a-d. The generated hash value may incorporate conflicted entries and unconfirmed entries.

If the monitor security program 110a-c determines that the conflicting entries, the unconfirmed entries, or both, have not reached pre-determined thresholds at 418, then a hash value will be generated from the accumulated temporary logs for validation from the monitors 202a-d at 420. The monitor security program 110a-c may wait until a predetermined number of events have transpired (e.g., 100 events or entries) before the entries are hashed for validation. At every hash, where one hash may be equal to 100 entries, one monitor 202a-d in the monitor chain network may play the role of the coordinator in the sequence. The coordinator monitor 202c may accumulate enough reported entries (e.g., 100 entries) to hash the data to be validated before the data is written into the permanent log.

Once the batch of entries is accumulated, the monitor security program 110a-c may calculate the unconfirmed values and the conflict values that have not reached a predetermined threshold and the confirmed values to create the hash value. Unconfirmed entries may also be known as a loss value out of the predetermined number of entries. The conflict value may be the number of conflicting entries reported out of the predetermined number of entries. The coordinator monitor 202c may change at each hash to make the next monitor 202a-d in the monitor chain coordinator for the next hash, and so on, in linear order of the monitors 202a-d in the monitor chain. For example, Monitor A 202a is coordinator for the first 100 entries and the first hash. Once the entries are validated, then Monitor B 202b may be the coordinator for the second 100 entries and second hash, and so on.

Next, at 422, the monitor security program 110a-c determines if the temporary log has received enough validations from the other monitors 202a-d in the monitor chain. When monitors 202a-d receive the request for validation, the monitors 202a-d check if the hashed value is equal to the monitor's own accumulated hashed value of their temporary log's collected entries. If the hashed value is equal to the monitor's 202a-d accumulated hashed value of the entries, then the monitor 202a-d may broadcast a pass message, which may validate the entries to be written into the log. Once the batch of entries are validated and hashed, the next monitor 202a-d in the chain may become the coordinator monitor 202c for the next block of entries for the next hash. The term enough may be defined by the byzantine fault tolerance algorithm or another similar fault tolerance algorithm.

When the monitors 202a-d in the monitor chain receive a request to validate, the monitors 202a-d may determine or calculate the hash value and compare the calculated hash value with the coordinator monitor 202c since all monitors 202a-d have the same information from the broadcasts. If the monitors 202a-d in the chain have determined the same hash value to provide validations, or enough validations via a fault tolerance algorithm, then the monitors 202a-d may broadcast a pass message. Upon receiving enough validations (i.e., pass messages), the coordinator monitor 202c may then write the accumulated hash value into the permanent log. The accumulated hash value may be calculated by all of the contents of the information received. The permanent log may contain many hashed values and the next coordinator monitor 202d may begin accumulating the next batch of entries for the next hash.

Inconsistencies in the validation process of the monitors 202a-d receiving more than one set of data, either from a sensor 302a-d or other monitors 202a-d in the monitor chain, may then be audited. Examples of inconsistencies may be determining whether or not someone has broken into a home or if someone has hacked into a company's enterprise network and altered data. Monitors 202a-d that disagree on the data for a particular entry may use an auditing feature since inconsistencies may show that a monitor 202a-d has been compromised or hacked. The validation process may trigger the audit and recovery process. Since validation is sought after a certain number of entries (e.g., 100 entries), if a monitor 202a-d has been compromised after the temporary log has been written to (i.e., an entry that has been marked as confirmed in the temporary log) and the data has been altered or deleted, then the validation process may show that enough monitors 202a-d do not agree on the hash value.

If the monitor security program 110a-c has determined that the accumulated temporary log has received enough validations from the monitors, then the hashed entries are written into the shared log at 424. The coordinator monitor 202c may have accumulated enough (e.g., based on the byzantine fault tolerance algorithm) validations from all monitors 202a-d in the monitor chain to write the hash value into the permanent shared log. Once the accumulated hash is validated, and the shared permanent log is written to, then the next monitor (e.g., 202d) in the monitor chain may play the role of coordinator for the next batch of entries.

If the monitor security program 110a-c determines that the conflicting entries, the unconfirmed entries, or both, have reached pre-determined thresholds at 418, or if the accumulated temporary log has not received enough validations from monitors 202a-d at 422, then an intrusion is detected by the monitor security program 110a-c and log writing halts at 426. If monitors 202a-d broadcast enough fail messages, then the validation process may fail and subsequently the audit and recovery process may be triggered. The first step once the audit and recovery process is triggered may be to not allow the shared log to be written to. Once one or more monitors 202a-d in the monitor network 200 are compromised, the permanent log may not allow the compromised data to be permanently hashed and logged. For example, a network intrusion may show that one or more monitors 202a-d may have conflicting hash values because one or more monitors 202a-d is reporting that there is a fire and other monitors 202a-d are reporting that no fire is present. The discrepancy of data may create a different hash calculation at the time of validation and if enough entries are not validated, then the network may have been hacked.

If the coordinator (i.e., monitor 202a-d currently writing to the permanent log) found that a threshold has been reached, then an intrusion may be detected and the permanent shared log may not be written to by the coordinator monitor 202c. Another example may be if three (3) entries have been marked as conflicting entries in the temporary log, the predetermined threshold (e.g., 3) has been reached and the log writing also halts. The entries may be in the form of a sensor 302a-d reporting a fire and one or some of the monitors 202a-d are reporting that there is no fire. If the data was compromised at one of the monitors 202a-d due to a hacker attempting to alter what the sensor 302a-d is reporting by falsifying data, the other monitors 202a-d may catch the discrepancy since the sensor 302a-d sent a message to more than one monitor 202a-d (i.e., a primary monitor and a backup monitor), which was then broadcasted to the other monitors 202a-d. For example, if the hacker compromised a monitor 202a in the monitor network 200, then the entries reported on the monitor 202a may consistently report incorrect or different information than the other monitors 202b-d in the monitor network 200. The monitor security program 110a-c will notice the multiple discrepancies on monitor 202a as an intrusion and will immediately halt the log writing.

Next at 428, the monitor security program 110a-c triggers an audit and recovery plan. Once an intrusion is detected and the log writing halts, the monitor security program 110a-c may initiate the audit and recovery plan by broadcasting to the monitors 202a-d that initiation of an audit and recovery process has begun. If any monitor 202a-d has initiated an audit and recovery request, the monitor 202a-d may notify the current user of the monitored system (e.g., user computer 102) that there are inconsistencies detected and a recovery plan may be prepared. The recovery plan may consist of calculating the occurrence of conflicts and the occurrence of loss of information on each monitor. The monitor security program 110a-c may use data from the sensor 302a-d, a time stamp, the primary monitor 202a, the backup monitor 202b, the other monitors 202c-d, the number of conflicts and the number of losses to locate the problem.

For example, in a network containing four sensors 1-4 (e.g., sensors 302a-d) and four monitors A-D (e.g., monitors 202a-d), the monitor security program 110a-c may determine what has been reported by the sensors 1-4 and compare what is reported from the sensors 1-4 with the information reported by the monitors A-D both as a primary monitor A-D and a backup monitor A-D. The following conflicts and losses are reported: sensor 1 reports a loss on either primary monitor A or backup monitor C (e.g., either monitor A did not report data or monitor C did not report data); sensor 2 reports a conflict on either primary monitor B or backup monitor D (e.g., monitors B and D reported different data); sensor 3 reports a conflict on either primary monitor A or backup monitor D; and sensor 4 reports a loss on either primary monitor A or backup monitor B. Then the monitor security program 110a-c calculates the number of occurrences a sensor 302a-d has used a particular monitor 202a-d divided by the number of conflicts or loss of information is reported. The number of occurrences is related to the total number of times a monitor 202a-d displays conflicts and losses (e.g., monitor A has 3 instances between both conflicts and losses displayed).

Sensors 2 and 3 have reported conflicts for 2 entries on monitors A, B and D. Monitor A has reported a conflict one time from sensor 3. The monitor security program 110a-c may divide the one reported conflict of monitor A with the 2 sensor entries that contained conflicting information, giving monitor A a conflict factor of 50%. Monitor B also has one reported conflict from sensor 2 out of the two conflicts reported, also giving monitor B a conflict factor of 50%. Sensors 1 and 4 have reported loss for two entries on monitors A, B and C. Monitor A has reported a loss two times for two sensor entries, giving monitor A a loss factor of 100%. Monitor B has reported a loss one time for two sensor entries, giving monitor B a loss factor of 50%. Monitor C has reported a loss one time for two sensor entries, giving monitor C a 50% loss factor. In summary, monitor A has a conflict factor of 50% and a loss factor of 100%, monitor B has a conflict factor of 50% and a loss factor of 50%, monitor C has a loss factor of 50%, and monitor D has a conflict factor of 100%. The health of the information related to monitor A and B has a 50% error rate for conflicting information. Monitor D has a 100% error rate for conflicting information. Monitor D shows the most severe conflict factor. Monitor A has a 100% error rate for information loss and shows the most severe loss factor. See table below.

| Sensor | Time | Primary Monitor | Backup Monitor | Conflict | Loss |
| --- | --- | --- | --- | --- | --- |
| 1 | | A | C | | Y |
| 2 | | B | D | Y | |
| 3 | | A | D | Y | |
| 4 | | A | B | | Y |
| Conflict Factor: Monitor A = 50%; Monitor B = 50%; Monitor D = 100% | | | | | |
| Loss Factor: Monitor A = 100%; Monitor B = 50%; Monitor C = 50% | | | | | |
| Conflict and Loss Factor: Monitor A = 75%; Monitor D = 50% | | | | | |

Now the monitor security program 110a-c may calculate the conflicts and losses together by using all 4 data entries from the sensors 302a-d against all conflicts and losses. Monitor A shows three instances of conflicts and losses out of the 4 sensor entries from sensors 1-4, which creates a 75% conflict and loss factor. Monitor B shows two instances of conflicts and losses out of the 4 sensor entries, which creates a 50% conflict and loss factor. Monitor C is only showing 1 loss out of the 4 sensor entries, which creates a 25% conflict and loss factor. Finally monitor D shows two instances of conflicts and losses out of 4 sensor entries, which creates a 50% conflict and loss factor. Next the monitor security program 110a-c may recommend a recovery plan to quarantine the monitor 202a-d with the highest percentage of errors, monitor A. The 75% error rate on monitor A may show that monitor A has obtained faulty information.

Then at 430, the monitor security program 110a-c quarantines the compromised monitor. A quarantine process may isolate a compromised monitor. Once an intrusion has been detected, the monitor security program 110a-c may quarantine the most severe monitor 202a-d (i.e., the monitor 202a-d with the most discrepancies). The most severe monitor 202a-d may be determined by the monitor security program 110a-c using the previously stated calculations.

The previous example shows monitor A has the most severe error rate so the coordinator monitor 202c may prepare a recovery plan to quarantine monitor A and reassign monitor A to the next monitor B in the monitor chain. The monitor security program 110a, 110b, 110c may then correct the 100 entry log, delete data from the faulty monitor A, and adopt the information collected from the rest of the monitors 202a-d in the monitor chain before broadcasting the recovery plan to the rest of monitors 202a-d in the monitor chain.

At 432, the monitor security program 110a-c broadcasts the recovery plan to the other monitors 202a-d. Once the monitor security program 110a-c initiates the audit and recovery process, the monitor security program 110a-c may notify users of the monitor 202a-d and prepare a recovery plan. The detected inconsistencies of the conflicts, losses, or both, may be analyzed by the monitor security program 110a-c by calculating the occurrences of the conflicts and the occurrences of losses on each monitor. The monitor security program 110a-c may utilize data to prepare a recovery plan by comparing the conflicts and losses that have occurred on each sensor 302a-d, monitor 202a-d and backup monitor 202b. The time of conflict or loss occurrence may also be noted. The monitor security program 110a-c may prepare an audit and recovery process by preparing a recovery plan that may calculate conflict and loss occurrences based on which sensor 302a-d and monitors 202a-d are reporting the conflict or loss. Next, the monitor security program 110a-c may quarantine the monitor 202a-d with the most conflict occurrences and loss occurrences, re-assign the corrupt monitor 202a-d and correct the entry log. The recovery plan may broadcast to all other monitors 202a-d and if, for example, more than two-thirds of the monitors 202a-d agree with the recovery plan, then the monitor security program 110a-c may execute the recovery plan. If the other monitors 202a-d do not agree with the recovery plan presented, then the monitor security program 110a-c may notify the users for human intervention.

Next at 434, the monitor security program 110a-c determines if the monitors 202a-d agree on the same recovery plan. If two-thirds (or some other threshold number) of the monitors 202a-d agree (i.e., have the same recovery plan) with the recovery plan, no human intervention may be necessary.

If the monitors 202a-d agree on the same recovery plan at 434, then the monitor security program 110a-c will execute the recovery plan at 436. The corrupted monitor 202a-d may be quarantined while the rest of the monitor network 200 keeps operating normally in accordance with the recovery plan.

If the monitors 202a-d do not agree on the same recovery plan at 434, then the monitor security program 110a-c will notify the user for human intervention at 438. A user may be notified by a dialog box or a graphic user interface (GUI) sent to the user's computer screen. For example, the notification sent from the monitor security program 110a-c may communicate to the user that the audit and recovery process was initiated, however, the monitors 202a-d do not agree on the recovery plan.

It may be appreciated that FIGS. 2, 3, 4A and 4B provide only an illustration of one embodiment and do not imply any limitations with regard to how different embodiments may be implemented. Many modifications to the depicted embodiment(s) may be made based on design and implementation requirements.

Figure 5:
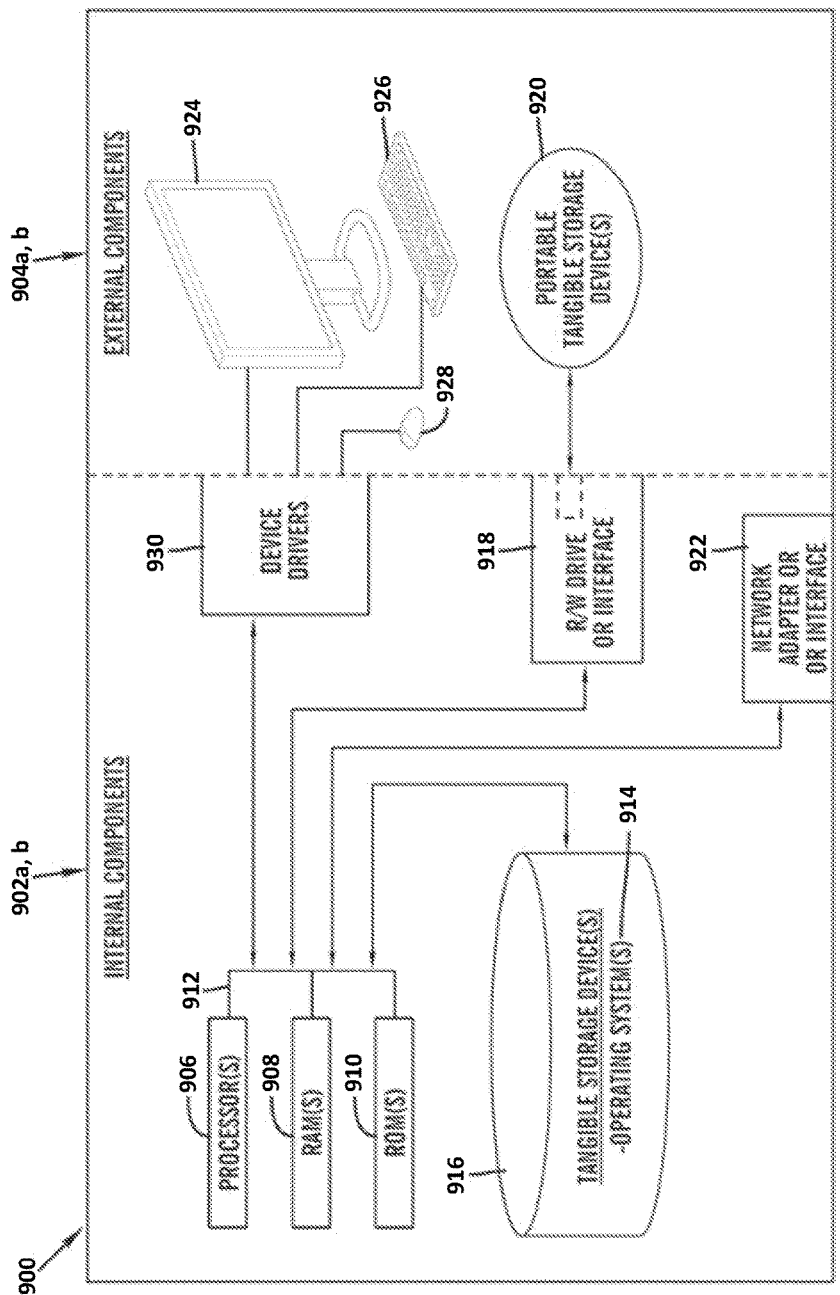
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and monitor computers 112a, 112b may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the monitor security program 110a in client computer 102, the monitor security program 110b in monitor computer 112a, and the monitor security program 110c in monitor computer 112b may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the monitor security program 110a-c can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the monitor security program 110a in client computer 102, the monitor security program 110b in monitor computer 112a, and the monitor security program 110c in monitor computer 112b can be downloaded from an external computer (e.g., server) via a network (for example, the Internet, a local area network or other, wide area network) and respective network adapters or interfaces 922. From the network adapters (or switch port adaptors) or interfaces 922, the software program 108 and the monitor security program 110a in client computer 102, the monitor security program 110b in monitor computer 112a, and the monitor security program 110c in monitor computer 112b are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
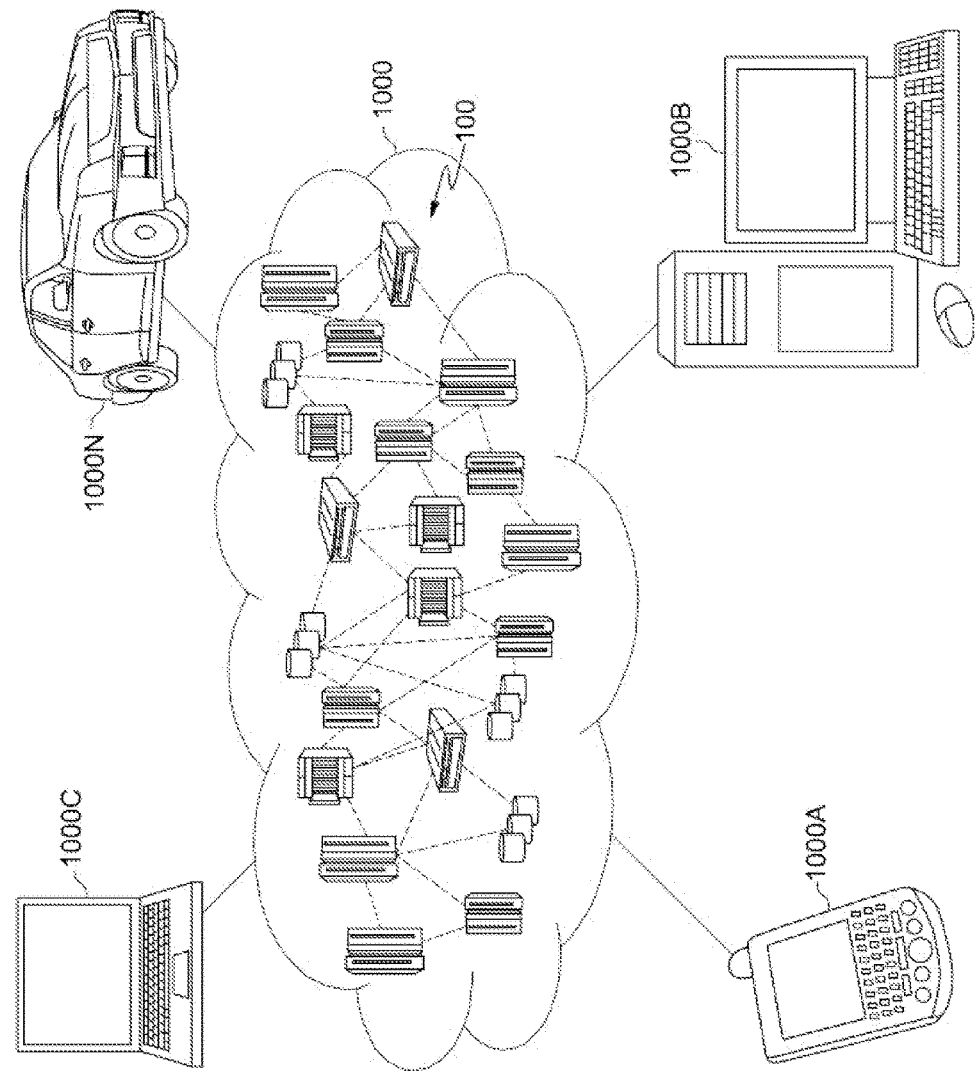
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
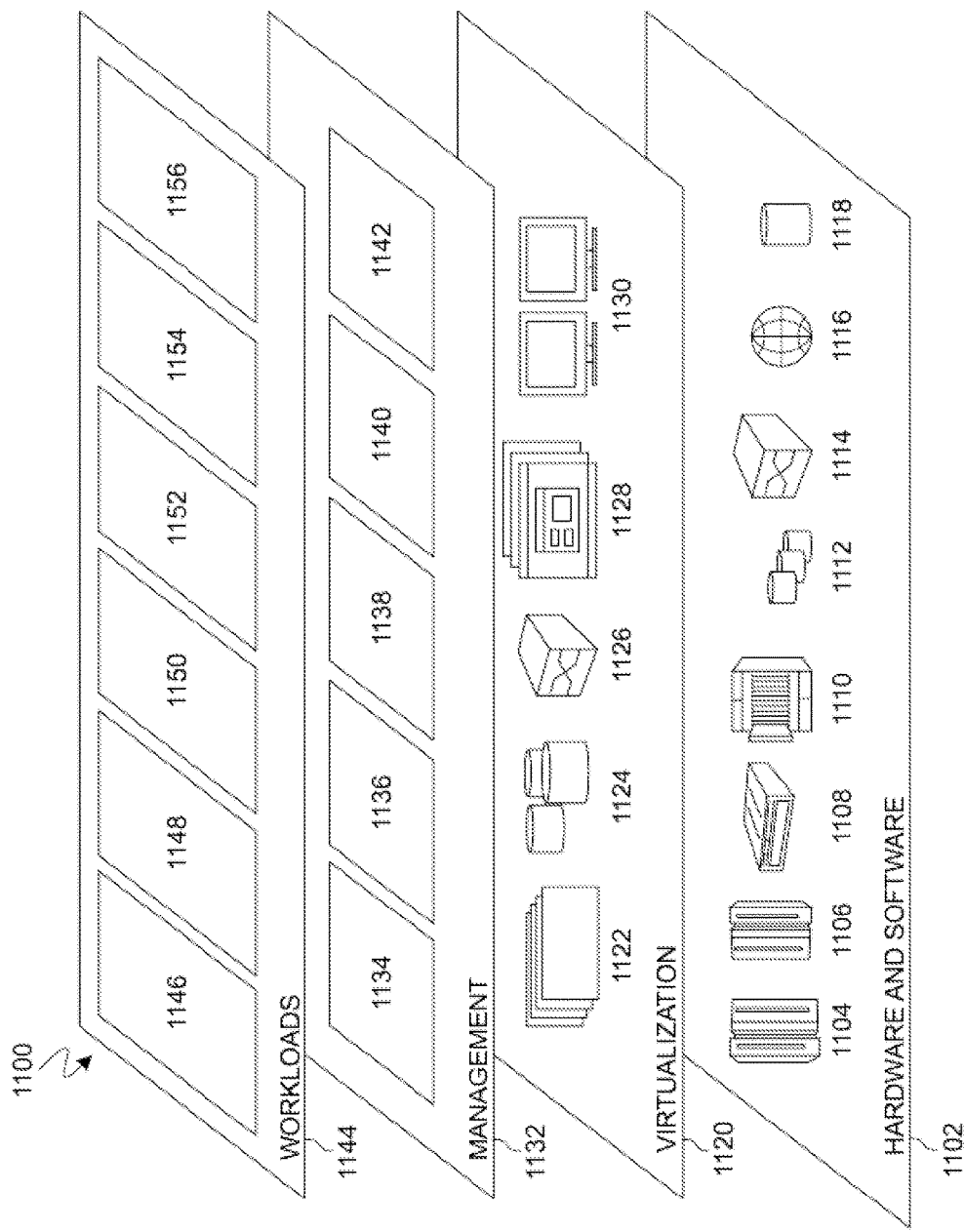
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and monitor security 1156. A monitor security program 110*a-c* provides a way to detect whether the network system has been hacked and if an audit and recovery process may be necessary to restore the network system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining security breaches within a network, the method comprising:

connecting a plurality of monitors in a chain configuration, wherein the plurality of monitors include a primary monitor and a backup monitor, wherein the primary monitor is connected to the backup monitor using a network address, wherein each monitor in the plurality of monitors has a temporary log, wherein each monitor in the plurality of monitors share a permanent log, wherein the plurality of monitors can write to the shared permanent log once a consensus is reached, and wherein the shared log uses blockchain technology;

configuring a sensor to communicate with the plurality of monitors;

receiving, by the sensor, information, wherein the information is based on an event;

receiving, by the primary monitor and the backup monitor, the information from the sensor;

broadcasting, by the primary monitor and the backup monitor to a group of monitors within the plurality of monitors, the received information, wherein the group of monitors are the remaining monitors in the plurality of monitors that do not include the primary monitor and the backup monitor, and wherein two broadcasts are sent to the group of monitors, a first broadcast from the primary monitor and a second broadcast from the backup monitor;

logging, by the primary monitor, the received information to a primary monitor temporary log;

logging, by the backup monitor, the received information to a backup monitor temporary log;

receiving and logging, by each monitor in the group of monitors in a temporary log for each monitor in the group of monitors, the first broadcast of information from the primary monitor;

receiving and marking, by each monitor in the plurality of monitors in the temporary log for each monitor in the plurality of monitors, the second broadcast from the backup monitor, wherein the second received broadcast is marked in the temporary log for each monitor as confirmed, conflicted or unconfirmed;

determining, by the primary monitor, that the first broadcast does not match the second broadcast, wherein the logged received information to the primary monitor temporary log does not match the logged received information from the second broadcast;

marking, by the primary monitor, a conflicting entry in the primary monitor temporary log based on determining the first broadcast does not match the second broadcast, wherein the conflicting entry creates a conflict value within the plurality of monitors;

determining, by the primary monitor, the marked conflicting entry has exceeded a predefined threshold of conflicts, and wherein the information in a third monitor temporary log conflicts with the primary monitor temporary log, and wherein a third monitor cannot validate the information when the third monitor receives a request for validation by the primary monitor;

detecting, by the primary monitor, an intrusion based on the exceeded predefined threshold of conflicts, wherein the detected intrusion ceases writing, by the primary monitor, to the shared permanent log;

triggering, by the primary monitor, an audit and recovery plan based on the detected intrusion, wherein the audit and recovery plan consists of gathering a plurality of data to locate which monitor in the plurality of monitors has been intruded and gathering consensus within the plurality of monitors that the located monitor is the intruded monitor;

determining, by a consensus within the plurality of monitors, that the intruded monitor is a third monitor based on the gathered plurality of data; and implementing a quarantine of the intruded monitor based on the triggered audit and recovery plan, wherein the quarantine reassigns the intruded monitor to a different monitor in the plurality of monitors and corrects the temporary log of the intruded monitor using a plurality of collected data from the remaining plurality of monitors.

\* \* \* \* \*